Oct. 1, 1946.      A. DAWSON      2,408,611
HOLDER FOR CONTAINERS
Filed Nov. 17, 1944
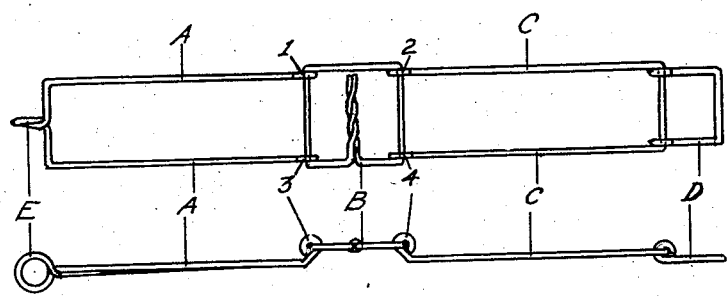
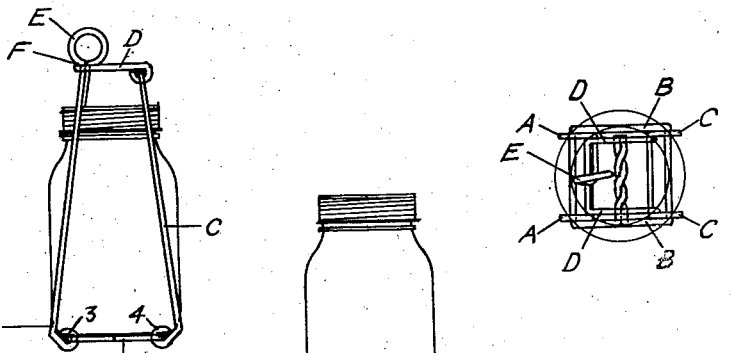
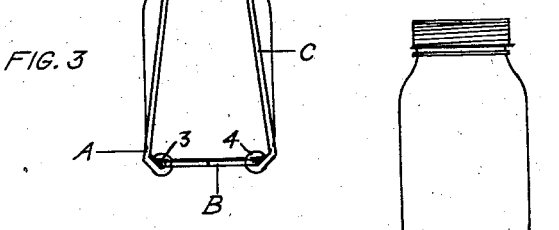
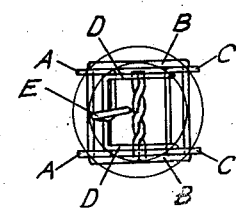
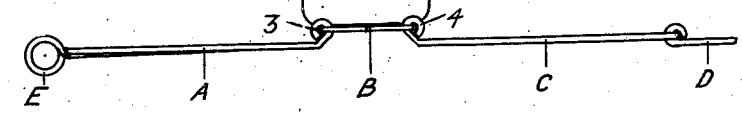
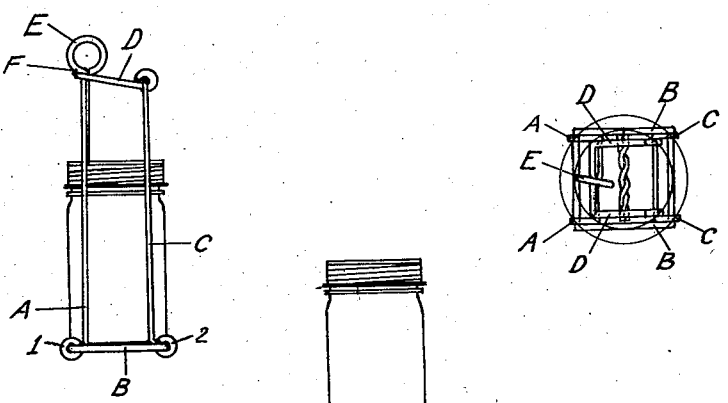
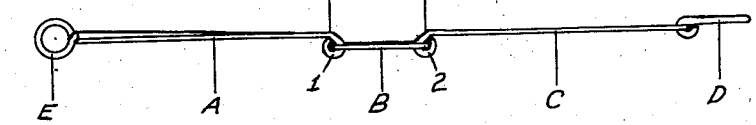
INVENTOR:
Albert Dawson Patented Oct. 1, 1946

2,408,611

UNITED STATES PATENT OFFICE 2,408,611

HOLDER FOR CONTAINERS

Albert Dawson, Tarentum, Pa.

Application November 17, 1944, Serial No. 563,919

3 Claims. (Cl. 224—48)

The invention relates to means whereby containers are held so they can be readily inserted in and removed from a vessel for processing the food in the containers.

An object of the invention is to provide a holder of this character in which it is easy to enclose the container in the holder.

Another object is to provide a holder the character of which permits easy removal of the holder from the top and sides of the container after the holder and the container have been removed from the processing liquid.

Another object is to provide a safe and positive enclosure for containers during the entire operation of processing including immersion, removal and placing on a working table or surface for further disposition of the container.

Another object is to provide a holder so that the container, once locked in the holder by manual operation, can only be unlocked or released from the holder by manual operation.

Another object is to provide a holder, the construction and design of which permits its use with a variety of sizes and shapes of the more commonly used containers or may be constructed within the spirit and scope of the claims to accommodate other containers for which holders may be desired.

Other objects and advantages will appear in the subjoined detailed description.

The accompanying drawing illustrates the invention.

Figure 1 is a plan view of the complete holder in open position.

Figure 2 is a side view of the complete holder in open position.

Figure 3 is a side view of the holder enclosing a quart container.

Figure 4 is a top view of the holder enclosing a quart container.

Figure 5 is a side view of the holder, unlocked and removed from the top and sides of a quart container with the container resting on the base portion of the holder.

Figure 6 is a side view of the holder enclosing a pint container.

Figure 7 is a top view of the holder enclosing a pint container.

Figure 8 is a side view of the holder, unlocked and removed from the top and sides of a pint container with the container resting on the base portion of the holder.

The holder comprises a pair of side standards A, a pair of side standards C, a base B and a locking loop D. All side standards are connected to the base B by pivoting loops integrally formed at one extremity of the above-mentioned side standards A and C. The locking loop D is formed in the general shape of a U and has integrally formed on its two extremities pivoting loops by means of which said locking loop is attached to the cross member portion of side standards C.

Side standards A are connected together at their opposite extremities from their points of connection with the base B by a cross member which is integrally formed with said side standards and which cross member has formed at its center and at right angles to said cross member a ring E, said ring E being integral with said side standards and said cross member.

All members may be formed of wire or the like and all members attach to adjacent members by means of pivoting loops or eyes which are integrally formed on the extremities of the various side standards and the locking loop.

Ring E which is integrally formed at the center point on the cross member portion connecting the two side standards A and being placed at right angles to said cross member, has its outermost point beyond the normal point of engagement of the locking loop D when the loop has been dropped over the ring and pressure has been released. The locking ring E, being at right angles to the cross member portion of the side standards A and also at right angles to the cross member portion of the locking loop D, it is necessary to exert slight manual effort to engage or disengage the locking loop D and ring E. The engagement of the locking loop D and ring E is at a point F that permits sufficient separation between side standards A and C to provide for the factor of expansion when the holder and the container are subjected to heat. To engage the locking loop D and the locking ring E when a container has been placed on the base B and side standards A and C have been raised to a more or less upright position, contacting the container preliminary to locking the container in the holder, it is then necessary to exert slight pressure at the top of said side standards causing upper portion of side standards A to move towards side standards C and vice versa sufficiently to permit the cross member portion of the locking loop D to descend past the point of the locking ring E furthest from the side standards C. Upon release of this manual pressure, the cross member portion of the locking loop D comes into engagement with the locking ring E at the point F which is at the base of ring E. To disengage the locking loop D from the locking ring E, pressure must be exerted in the manner and at such points as described above. The action of the side standards will then be as described above and by lifting the locking loop D up and past the outermost point of the locking ring E, release will be accomplished.

All standards have integrally formed at one of their extremities loops or eyes joining the standards to the base B. These loops are placed at 45 degrees to the standards. Standards A connect to the base B in opposite direction from the direction from which standards C are connected to the base B. The incorporation of the angles aforementioned provides a difference of distance between the standards A and C by the simple act of turning the entire holder over or up-side-down. This difference in distance between standards A and C makes possible the use of the holder for a variety of sizes of containers. In sizes for which holders are constructed and after the containers have been placed in the holder and after the locking loop and locking ring have been placed in engagement, the standards A and C are sufficiently close together to prevent any possible emergence of the container from or through the sides, top or bottom of the holder.

The base B is formed square and includes a supporting member which prevents the penetration of the container through the base B.

To use the holder, the holder is spread out flat on a working surface, the container is then placed on the base B, the standards A and C are raised radially to their point of attachment with the base B against the sides or walls of the container, slight pressure is exerted at the top of the standards A and C to permit the locking loop D to drop over the locking ring E; pressure is then released and normal engagement of the locking loop D takes place at point F which is at the base of the ring E. The container, being now securely locked in the holder, is ready to be placed in the processing bath. Upon removal from the processing bath and to remove the holder from the sides and top of the container, slight pressure is again exerted at the top of the standards A and C, the locking loop D is raised over the locking ring E and the standards A and C are permitted to recede to the working surface, leaving the container standing entirely free on the base B.

The four pivoting loops or eyes 1, 2, 3 and 4 which join the standards A and C to the base B also prevent the base B and the container from coming into direct contact with the bottom of the immersing vessel.

Any number of these holders in which containers have been locked may be inserted in a cooking vessel of suitable size. The vessel can be covered to conserve heat during the time of processing or cooking and when cooking has been completed, the holders, together with the enclosed containers may be removed one at a time and placed on a working space where the holders can be removed from the top and sides of the containers by the simple act of releasing the locking loop D from engagement with the locking ring E. The containers are then readily accessible to the operator.

As clearly shown in the drawing, the holders may be made of wire. In this instance the holder is made of four pieces of wire; standards A constitute one piece of wire, standards C constitute a second piece of wire, the base B constitutes a third piece of wire and the locking loop D constitutes a fourth piece of wire.

The holder may be formed by hand or by suitable dies in a manner well understood in the art pertaining to the bending of wire.

The invention is not limited in its broader phases to the details of construction shown in the drawing and described above, but include such changes and modifications as lie within the spirit and scope of the appended claims.

I claim:

1. A reverse folding, two-size, completely confining holder for containers comprising a square base formed of one piece of wire with the extremities extended within the square and two opposite sides serving as axes for standards, a pair of standards and a cross member that serves as an axis formed from one piece of wire in the shape of three sides of a rectangle, the two standards being angularly disposed near the extremities of the wire and such extremities being formed into pivoting loops about one side of the square base, a single piece of wire formed into the shape of three sides of a rectangle with the extremities of the wire formed into pivoting loops about the cross member portion of the aforementioned standards, a pair of standards and a cross member formed from one piece of wire in the general shape of three sides of a rectangle and having extended therefrom at the center of the cross member portion a ring twisted at right angle to said cross member portion, the two standards being angularly disposed near the extremities of said wire and having said extremities formed into pivoting loops about the side of the base opposite to the side to which the first set of standards is attached, the angularly disposed standards folded to rise vertically from points outside the perimeter of the base and with the pivoting loop on the one set of standards dropped over the ring on the other set of standards thereby completing a structure for completely confining a container of one size or, reversed, the angularly disposed standards folded to rise vertically from points within the perimeter of the base and with the pivoting loop on the one set of standards dropped over the ring on the other set of standards thereby completing a structure for completely confining a container of another size, substantially as and for the purpose herein shown and described.

2. A folding holder for containers comprising a square base formed of one piece of wire with the extremities extended within the square and two opposite sides serving as axes for standards, a pair of standards and a cross member that serves as an axis formed from one piece of wire in the shape of three sides of a rectangle, the two standards being angularly disposed near the extremities of the wire and such extremities being formed into pivoting loops about one side of the square base, a single piece of wire formed into the shape of three sides of a rectangle with the extremities of the wire formed into pivoting loops about the cross member portion of the aforementioned standards, a pair of standards and a cross member formed from one piece of wire in the general shape of three sides of a rectangle and having extended therefrom at the center of the cross member portion a ring twisted at right angle to said cross member portion, the two standards being angularly disposed near the extremities of said wire and having said extremities formed into pivoting loops about the side of the base opposite to the side to which the first set of standards is attached, the angularly disposed standards folded to rise vertically from points outside the perimeter of the base and with the pivoting loop on the one set of standards dropped over the ring on the other set of standards thereby completing a structure for completely confining a container of one size or, reversed, the angularly disposed standards folded to rise vertically from points within the perimeter of the base and with the pivoting loop on the one set of standards dropped over the ring on the other set of standards thereby completing a structure for completely confining a container of another size, substantially as and for the purpose herein shown and described.

3. The combination comprising a square base formed of one piece of wire with the extremities extended within the square and two opposite sides serving as axes for standards, a pair of standards and a cross member that serves as an axis formed from one piece of wire in the shape of three sides of a rectangle, the two standards being angularly disposed near the extremities of the wire and such extremities being formed into pivoting loops about one side of the square base, a single piece of wire formed into the shape of three sides of a rectangle with the extremities of the wire formed into pivoting loops about the cross member portion of the aforementioned standards, a pair of standards and a cross member formed from one piece of wire in the general shape of three sides of a rectangle and having extended therefrom at the center of the cross member portion a ring twisted at right angle to said cross member portion, the two standards being angularly disposed near the extremities of said wire and having said extremities formed into pivoting loops about the side of the base opposite to the side to which the first set of standards is attached, the angularly disposed standards folded to rise vertically from points outside the perimeter of the base and with the pivoting loop on the one set of standards dropped over the ring on the other set of standards thereby completing a structure for completely confining a container of one size or, reversed, the angularly disposed standards folded to rise vertically from points within the perimeter of the base and with the pivoting loop on the one set of standards dropped over the ring on the other set of standards thereby completing a structure for completely confining a container of another size, substantially as and for the purpose herein shown and described.

ALBERT DAWSON.